No. 631,536. Patented Aug. 22, 1899.
W. B. BRADSBY.
MEASURING INSTRUMENT.
(Application filed Nov. 12, 1898.)
(No Model.) 2 Sheets—Sheet 1.
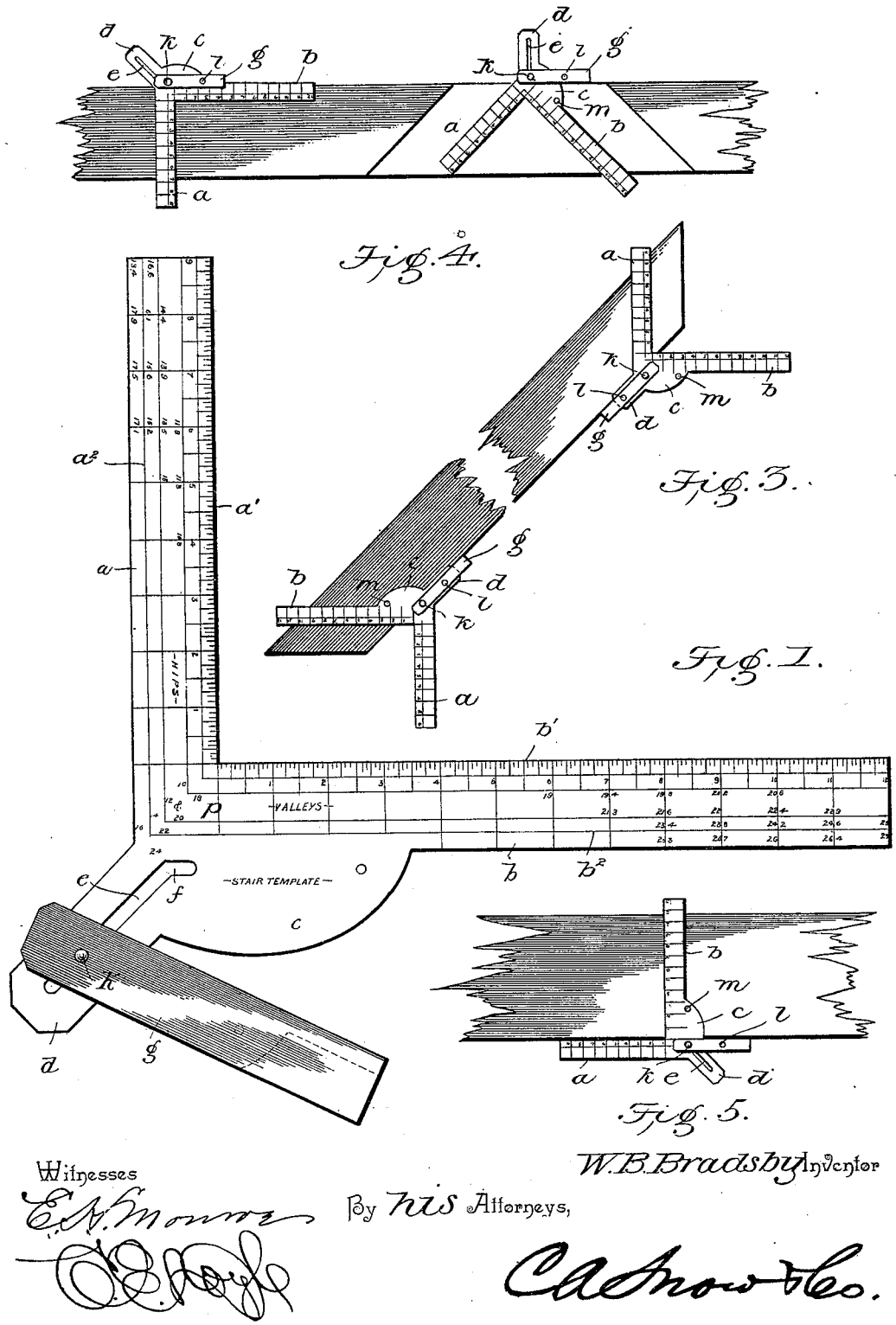
Witnesses  
W. B. Bradsby, Inventor  
By his Attorneys,

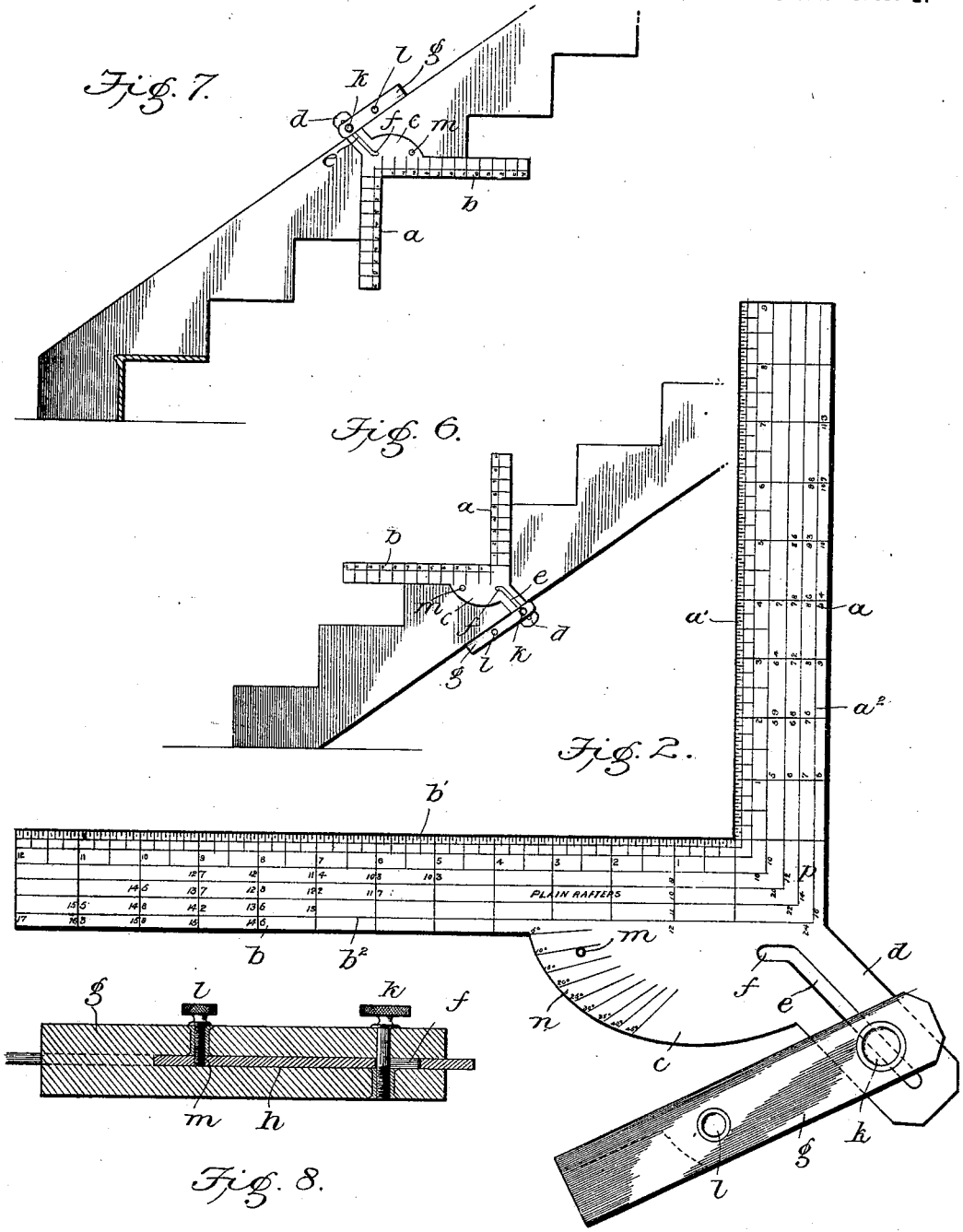

UNITED STATES PATENT OFFICE.

WILLIAM B. BRADSBY, OF GREENVILLE, ILLINOIS, ASSIGNOR OF ONE-HALF TO EDMOND DE MOULIN AND ULYSSES S. DE MOULIN, OF SAME PLACE.

MEASURING INSTRUMENT.

SPECIFICATION forming part of Letters Patent No. 631,536, dated August 22, 1899.

Application filed November 12, 1898. Serial No. 696,272. (No model.)

*To all whom it may concern:*

Be it known that I, WILLIAM B. BRADSBY, a citizen of the United States, residing at Greenville, in the county of Bond and State of Illinois, have invented a new and useful Measuring Instrument, of which the following is a specification.

My invention relates to measuring instruments, and particularly to means in connection with a carpenter's try-square, whereby the terminal cuts of rafters and other timbers, and also cuts of stair-horses and wall-strings may be laid off, the blades of the try-square being provided with graduations whereby the lengths of rafters and similar timbers may be ascertained when the angle of the pitch or the "rise" and "run" are known.

Further objects and advantages of this invention will appear in the following description, and the novel features thereof will be particularly pointed out in the appended claims.

In the drawings, Figures 1 and 2 are views of opposite sides of a measuring instrument constructed in accordance with my invention. Fig. 3 is a view of the instrument applied in different positions to a rafter or similar timber for indicating the angles of the terminal cuts thereof. Fig. 4 shows positions of the instrument with relation to a timber in laying off miter and square cuts, respectively. Fig. 5 is a view of the instrument when used as a T-square. Fig. 6 shows the instrument applied to a timber for laying off the cuts of a stair-horse. Fig. 7 is a view showing the position of the instrument with relation to a timber in laying off the cuts of a wall-string. Fig. 8 is a longitudinal section of the arm, showing it arranged parallel with one of the blades of the try-square, as when the instrument is in use for laying off square cuts.

Similar reference characters indicate corresponding parts in all the figures of the drawings.

The instrument embodying my invention includes a try-square having right-angularly-disposed blades $a$ and $b$ and an extension or templet $c$ rigid and preferably integral with the try-square and having a tongue $d$, provided with a slot $e$, which extends outward from the angle formed by the blades $a$ and $b$ and at an angle of forty-five degrees to both of said blades. At its inner end this slot is provided with an offset $f$. Carried by the templet $c$ is an adjustable arm $g$, which comprises longitudinal straight edges and which is slotted longitudinally, as shown at $h$, to form parallel-spaced cheeks or elements arranged, respectively, upon opposite sides of the plane of the templet, and connecting the inner ends of said cheeks or elements is a clamping or locking device, consisting in the construction illustrated of a thumb-screw $k$, of which the stem or shank extends through the slot $e$ and is adapted to pass therefrom into the offset $f$. Also connecting the cheeks or elements of the slotted movable arm $g$ at an intermediate point is a lock $l$, consisting of a set-screw adapted to engage an opening or depression $m$ formed in the templet adjacent to the line of the outer edge of the blade $b$ to secure the arm $g$ in a position parallel with the blade $b$.

Formed upon the surface of the templet in different angular positions are graduations forming an angle-scale $n$, with either of which the inner edge of the movable arm $g$ may register when the combined pivot and locking device $k$ is engaged with the slot of the offset $f$ at its extremity, and arranged upon the surfaces of the blades $a$ and $b$ are graduations representing linear measurements, such as inches, (see $a'$ and $b'$,) and lines $a^2$ and $b^2$, respectively, parallel with the side edges of the blades $a$ and $b$ and designated at their points of intersection by characters representing spans, said graduations forming a scale $p$. Also at the points of intersection of these lines $a^2$ and $b^2$, with the lines indicating linear measurements, are arranged graduations representing lengths of timbers having runs corresponding, respectively, with the linear measurements.

When it is desired to ascertain the length of a timber—as, for instance, a plain rafter for use upon a pitched roof of which the span is eighteen feet—the numeral "18" in the span scale $p$ is selected, and the longitudinal line $b^2$, which is designated by said span character "18," is followed to the point of intersection thereof with the character "9" upon the linear scale $b'$, which represents the desired elevation or height of the pitch. The character at the intersection of these lines represents the length of the desired timber or 12.7 feet. It will be understood that any other unit of measurement may be employed. Then in order to lay off the terminal cuts of the rafter having the discovered length the try-square may be arranged, as shown in Fig. 4, upon a timber with the characters "9 9," representing the run and height of the pitch at one edge of the timber, after which the adjustable arm *g* should be adjusted and locked in contact with the opposite edge of said timber, whereupon the blades of the square will indicate, respectively, the terminal cuts of the timber, or the instrument may be applied to the timber, as indicated in Fig. 3.

When it is desired to form a square cut, the movable arm *g* should be secured by the locking device *l* in its position parallel with the arm *b*, and the instrument should be applied to the timber, as indicated also in Fig. 4. Furthermore, the instrument may be adapted for use as a T-square by disposing the arm *g* in a position in alinement with the arm *a*, as indicated in Fig. 5. Moreover, in laying off stair-horses the blades of the try-square may be arranged upon a timber in the desired relative positions—as, for instance, to form a seven-inch tread and a five-inch rise—by referring to the graduations of the scales *b'* and *a'*, respectively, and clamping the movable arm *g* in contact with the back or opposite edge of the timber, as shown in Fig. 6, and to lay off the cuts of a wall-string, adapted to fit the stair-horse, as shown in Fig. 6, the instrument should be reversed, as indicated in Fig. 7, without changing the adjustment of the arm *g*. Thus it will be seen that an adjustable arm constructed and arranged as described in connection with the try-square adapts the instrument for use in laying off the various timbers used in building, said movable arm forming an attachment which may remain permanently in connection with the try-square or may be removed at will, and which at the same time is capable of prompt adjustment to occupy the desired position with relation to the blades of the try-square to enable said blades to be arranged in the required positions to indicate the several cuts of the timber. Furthermore, the movable arm may be arranged in an angular position, as hereinbefore mentioned, by disposing the pivot-screw *k* in the extremity of the slot-offset *f* and alining the edge of the arm with the desired radial line of the angle-gage *n*.

In practice various changes in the form, proportion, and the minor details of construction may be resorted to without departing from the spirit or sacrificing any of the advantages of the invention.

Having described my invention, what I claim is—

1. The combination of a try-square, a movable arm comprising a straight-edge pivotally mounted upon the try-square, with its pivotal point adapted for adjustment in a direction parallel to a line bisecting the angle between the blades of the try-square, and means for securing said arm at the desired adjustment, substantially as specified.

2. The combination of a try-square having a slot disposed at an angle of forty-five degrees to its arms, and a movable arm comprising a straight-edge having a pivot adjustably fitted in said slot, and adapted to be secured at the desired adjustment, substantially as specified.

3. The combination of a try-square having a slotted tongue extending outward from the angle of intersection of its blades, and a movable arm comprising a straight-edge having a clamping-pivot fitted in the slot of said tongue, substantially as specified.

4. The combination of a try-square having a templet and a tongue arranged exteriorly of the blades of the square and having an oblique slot extending beyond lines formed as continuations of the outer edges of both blades, a movable arm comprising a straight-edge adapted to swing in a plane parallel with said templet and provided at one end with a pivot adjustably fitted in the slot of said tongue, and a locking device for securing the arm in a position parallel with one of the blades of the try-square, substantially as specified.

5. The combination of a try-square having a templet provided with a seat *m* and an obliquely-slotted tongue *d*, a longitudinally-slotted arm having its cheeks arranged upon opposite sides of the plane of said templet and tongue, a set-screw connecting the cheeks of the movable arm and extending through the slot of said tongue to pivot the arm, and adapted to be tightened to secure the arm at the desired adjustment, and a second set-screw carried by the arm for engagement with said seat, substantially as specified.

6. A measuring instrument having a try-square provided with an exterior templet graduated to form a protractor, and also provided with a slot disposed at an angle to the arms of the try-square and having its inner end offset on a line approximately parallel with one of said blades, and a pivotal arm having its pivot fitted for adjustment in said slot and adapted to be secured at the desired adjustment with relation to the blades of the try-square, substantially as specified.

In testimony that I claim the foregoing as my own I have hereto affixed my signature in the presence of two witnesses.

WILLIAM B. BRADSBY.

Witnesses:
R. R. REID,
L. N. REID.